(12) United States Patent
Moriguchi et al.

(10) Patent No.: US 9,147,879 B2
(45) Date of Patent: Sep. 29, 2015

(54) COMPOSITE NANO POROUS ELECTRODE MATERIAL, PROCESS FOR PRODUCTION THEREOF, AND LITHIUM ION SECONDARY BATTERY

(75) Inventors: Isamu Moriguchi, Nagasaki (JP); Hirotoshi Yamada, Nagasaki (JP)

(73) Assignee: NAGASAKI UNIVERSITY, Nagasaki (JP)

( * ) Notice: Subject to any disclaimer, the term of this patent is extended or adjusted under 35 U.S.C. 154(b) by 465 days.

(21) Appl. No.: 13/380,026

(22) PCT Filed: Jun. 24, 2010

(86) PCT No.: PCT/JP2010/060782
§ 371 (c)(1),
(2), (4) Date: Dec. 21, 2011

(87) PCT Pub. No.: WO2010/150857
PCT Pub. Date: Dec. 29, 2010

(65) Prior Publication Data
US 2012/0100422 A1 Apr. 26, 2012

(30) Foreign Application Priority Data
Jun. 25, 2009 (JP) .................... 2009-151523

(51) Int. Cl.
*H01M 4/58* (2010.01)
*H01M 4/583* (2010.01)
(Continued)

(52) U.S. Cl.
CPC ............... *H01M 4/587* (2013.01); *B82Y 30/00* (2013.01); *C01B 25/37* (2013.01); *H01M 4/364* (2013.01); *H01M 4/5825* (2013.01);
(Continued)

(58) Field of Classification Search
None
See application file for complete search history.

(56) References Cited

U.S. PATENT DOCUMENTS

2007/0190418 A1* 8/2007 Chiang et al. ............... 429/221
2009/0286159 A1 11/2009 Nuspl

FOREIGN PATENT DOCUMENTS

CA 2617134 A1 11/2006
CN 101189747 A 5/2008
(Continued)

OTHER PUBLICATIONS

Junbiao Lu et al., "Preparation of LiFePO4 with inverse opal structure and its satisfactory electrochemical properties", Materials Research Bulletin, 2005, vol. 40, p. 2039-2046.
(Continued)

*Primary Examiner* — Jonathan Crepeau
(74) *Attorney, Agent, or Firm* — Chernoff, Vilhauer, McClung & Stenzel, LLP (57) ABSTRACT

This invention provides a nano composite porous electrode material that has high charge-discharge behavior and charge or discharge capacity and a manufacturing method thereof. It also provides a lithium-ion secondary battery using this nano composite porous electrode material. The nano composite porous electrode material according to this invention has a porous structure such that nano-size pores are three-dimensionally connected with each other wherein walls of the pores thereof are composed of olivine type $LiMnPO_4$ and carbon, a specific surface area Sa is 55 $m^2g^{-1}$<Sa<248 $m^2g^{-1}$, an amount of contained carbon Cc is 15.5 wt %<Cc<28 wt % and a diameter of crystallite is less than 39 nm. This enables a high charge-discharge capacity and a fast charge or discharge behavior to be obtained.

6 Claims, 8 Drawing Sheets

(51) Int. Cl.
| | |
|---|---|
| *H01M 4/133* | (2010.01) |
| *H01M 4/136* | (2010.01) |
| *C01B 25/37* | (2006.01) |
| *H01M 4/587* | (2010.01) |
| *B82Y 30/00* | (2011.01) |
| *H01M 4/36* | (2006.01) |
| *H01M 10/0525* | (2010.01) |
| *H01M 4/02* | (2006.01) |

(52) U.S. Cl.
CPC ......... *H01M 10/0525* (2013.01); *H01M 4/133* (2013.01); *H01M 4/136* (2013.01); *H01M 2004/021* (2013.01); *Y02E 60/122* (2013.01)

(56) References Cited

FOREIGN PATENT DOCUMENTS

| EP | 1722428 A1 | 11/2006 |
|---|---|---|
| EP | 1883984 A1 | 2/2008 |
| JP | 200560181 A | 3/2005 |
| JP | 2007-048612 * | 2/2007 |
| JP | 200816792 A | 1/2008 |
| JP | 2008541364 A | 11/2008 |
| JP | 200929670 A | 2/2009 |
| WO | 2006119995 A1 | 11/2006 |
| WO | WO 2009/144600 * | 12/2009 |

OTHER PUBLICATIONS

Mayato Izumi et al., "Nano Takoka shita Olivine-gata LiMPO4 (M=Fe,Mn) no Shutsuryoku Tokusei", Kagaku Kanren Shibu Godo Kyushu Taikai—Gaikokujin Kenkyusha Koryu Kokusai Symposium Koen Yokoshu, 2008, p. 166 (Non-English) (with English abstract "Output properties of nano porous olivine type LiMPO4 (M=Fe,Mn)").

Mayato Izumi et al., "LiMnPO4 Nano Tako Denkyoku no Kosoku Juhoden Tokusei",CSJ: The chemical Society of Japan Nishi Nippon Taikai Koen Yokoshu, 2008, p. 189 (with English abstract "Rapid-charge-discharge properties of nano porous LiMnPO4 Electrode").

Isamu Moriguchi et al, "LiMnPO4/C Tako Fukugoka ni yoru Ko Shutsuryoku Ko Yoryo Denkyoku no Sosei", Battery Symposium in Japan Koen Yoshishu, Nov. 30, 2009, p. 18 (Non-English).

Isamu Moriguchi et al., "Colloid Kessho Template-ho ni yoru Takosei LiMnPO4 C Fukugotai Denkyoku no Sakusei", Battery Symposium in Japan Koen Yoshishu, Nov. 5, 2008, p. 385 (Non-English).

International Search Report for PCT/JP2010/060782, Sep. 10, 2010.

Verification of Translation by Kenichi Aihara of Japanese Patent Application No. 2009-151523, dated Jul. 7, 2015, 37 pgs.

* cited by examiner

COMPOSITE NANO POROUS ELECTRODE MATERIAL, PROCESS FOR PRODUCTION THEREOF, AND LITHIUM ION SECONDARY BATTERY

TECHNICAL ART

This is a national stage application filed under 35 USC 371 based on International Application No. PCT/JP2010/060782 filed Jun. 24, 2010 and claims priority under 35 USC 119 of Japanese Patent Application No. JP 2009-151523 filed Jun. 25, 2009.

This invention principally relates to a manufacturing method of nano composite porous electrode material to be used as a positive electrode active material of a lithium-ion secondary battery and the lithium-ion secondary battery.

BACKGROUND TECHNOLOGY

Since a lithium-ion secondary battery has a high energy density, it has widely utilized as power source for small-sized electronic equipment such as a portable phone or a notebook computer. It has been recently desired to allow the battery to realize a larger capacity and a higher power output in order to apply it to a power source for electric auto vehicle. Although $LiCoO_2$ is mainly used as positive electrode materials for a currently used lithium-ion secondary battery, it has problems such that cobalt (Co) is extremely expensive and has a very high toxicity. Therefore, a new material has been recently developed to aim at a positive electrode using no cobalt.

In the development of the new positive electrode material, an attention is riveted to any olivine type compound $LiMPO_4$ (M is Fe or Mn) composed of Fe and/or Mn which is (are) electrochemically stable and resources of which are rich. It, however, has an electronic conductivity of about 10-9 $Scm^{-1}$, which is low, and has also a diffusion velocity of Li ion in a crystal of $10^{-14}$ through 10-16 $cm^2S^{-1}$, which is excessively late, unless it is treated. Thus, it has such an excessively poor rate performance and a problem so that it is difficult to obtain a sufficient output or capacity.

Regarding $LiFePO_4$, recently, it has been clearly shown that its performance can be improved by means of nano-sizing method, carbon composition method or the like, which causes its application to be desired. Further, a patent document 1 discloses positive electrode materials in which in olivine type $LiFePO_4$, its conductivity is improved by changing a part of Fe to Ti and which realizes larger capacity and higher rate performance by processing them as fine particles.

On the other hand, $LiMnPO_4$ has a discharge potential of 4V (vs. Li/Li$^+$) which is desired to have higher energy density and higher output than those of $LiFeO_4$ that has a discharge potential of 3.4V (vs. Li/Li$^+$). Since $LiMnPO_4$, however, has been inferior to $LiFeO_4$ in electronic conductivity or diffusion of Li ion, its sufficient performance has not yet shown under the existing circumstances.

PRIOR ARTS

Patent Documents

Patent Document 1: Japanese Patent Application Publication No.2009-29670

DISCLOSURE OF THE INVENTION

Problem(s) to be Solved by the Invention

In view of the above-mentioned points, this invention provides a nano composite porous electrode material that has high charge-discharge behavior and high charge or discharge capacity and a manufacturing method thereof. Further, it also provides a lithium-ion secondary battery using this nano composite porous electrode material.

Means for Solving the Problem(s)

In order to solve the above-mentioned problem and satisfy the object of this invention, a nano composite porous electrode material according to this invention is composed of olivine type $LiMnPO_4$ having pores formed to nano size. Its specific surface area Sa is 55 $m^2g^{-1}$<Sa<248 $m^2g^{-1}$, an amount of contained carbon Cc is 15.5 wt %<Cc<28 wt % and a diameter of crystallite is less than 39 nm.

In the nano composite porous electrode material according to this invention, the pores are formed to have three-dimensional regularity. Further, since the carbon is contained at a rate of 15.5 wt %<Cc<28 wt %, electronic conductivity is improved. Additionally, since the specific surface area Sa is 55 $m^2g^{-1}$<Sa<248 $m^2g^{-1}$, which is more than that of the conventional olivine type $LiMnPO_4$, so that since an area of reactive interface is enlarged, intercalation/deintercalation rate of Li ion is improved.

Further, a manufacturing method of a nano composite porous electrode material according to this invention contains, first, a step of preparing mold particles, and a step of dipping the mold particles into a precursor solution of inorganic source solution of $LiMnPO_4$ and a carbon source. The carbon source contains sucrose and is mixed so that its molarity is made larger than a molarity of Mn in the precursor solution. It also contains a step of firing composite of the mold particles and the precursor solution at a firing temperature of from 600° C. or more to less than 900° C. and removing the mold particles.

In the manufacturing method of a nano composite porous electrode material according to this invention, the mold particles are removed by the firing so as to form porous material having nano-size pores and composed of olivine type lithium manganese phosphate ($LiMnPO_4$) in which a specific surface area Sa is 55 $m^2g^{-1}$<Sa<248 $m^2g^{-1}$. Further, at a moment of the firing, a part of polystyrene and sucrose added is carbonized and remained. Thus, a nano composite porous electrode material of a carbon in which an amount of contained carbon Cc is within a range of 15.5 wt %<Cc<28 wt % and $LiMnPO_4$ is realized.

Additionally, a lithium-ion secondary battery according to the invention is configured so as to have a positive electrode element, a negative electrode element and a nonaqueous electrolyte. The positive electrode element contains, as a positive electrode active material, a nano composite porous electrode material composed of olivine type $LiMnPO_4$ having pores formed to nano size, in which a specific surface area Sa is 55 $m^2g^{-1}$<Sa<248 $m^2g^{-1}$, an amount of contained carbon Cc is 15.5 wt %<Cc<28 wt % and a diameter of crystallite is less than 39 nm, and by which lithium ions are adsorbed or discharged. Further, the negative electrode element contains a negative electrode active material which adsorbs or discharges the lithium ions at lower electric potential than that of the positive electrode active material. The nonaqueous electrolyte also has a composition such that lithium salts are dissolved in a nonaqueous solvent solution.

Effect of the Invention

According to the invention, it is possible to obtain the nano composite porous electrode material which has a high capacity performance and a fast charge and discharge behavior.

Further, by using the nano composite porous electrode material, it is capable of obtaining the lithium-ion secondary battery having a high performance.

EMBODIMENTS FOR CARRYING OUT THE INVENTION

<1. First Embodiment>

The following will describe a nano composite porous electrode material according to a first embodiment of this invention and a manufacturing method thereof with reference to FIGS. 1 through 12.

[Configuration of Nano Composite Porous Electrode Material]

First, the following will describe a configuration of the nano composite porous electrode material according to this embodiment and its characteristics thereof. The nano composite porous electrode material according to this embodiment has a porous structure such that nano-size pores are three-dimensionally connected with each other and walls of the pores thereof are composed of olivine type $LiMnPO_4$ and carbon. Further, the specific surface area Sa thereof is 55 $m^2g^{-1}<Sa<248$ $m^2g^{-1}$, an amount of contained carbon Cc is 15.5 wt %<Cc<28 wt % and a diameter of crystallite is less than 39 nm.

The following will describe a manufacturing method of the nano composite porous electrode material according to this embodiment.

[Manufacturing Method of Nano Composite Porous Electrode Material]

Figure 1A:
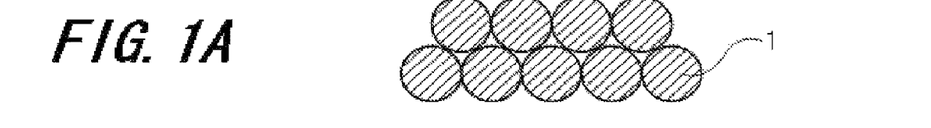
[FIGS. 1A through 1C] are process diagrams showing a manufacturing method of a nano composite porous electrode material according to a first embodiment of this invention.
Figure 1B:
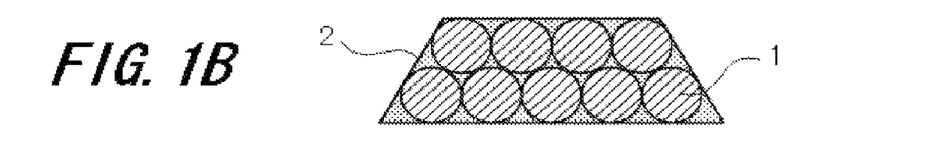
Figure 1C:
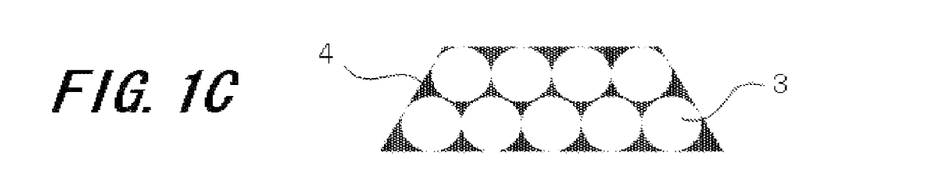

The following will describe a manufacturing method of the nano composite porous electrode material according to this embodiment with reference to FIGS. 1A through 1C.

First, by centrifuging colloidal dispersion which contains polystyrene having particle size of not less than 100 nm and not more than 400 nm, colloid crystals composed of the polystyrene particles are made. By decompressing and drying these polystyrene particles, as shown in FIG. 1A, polystyrene particles 1 to become mold particles are obtained.

On the other hand, by mixing water with ethanol, a mixed solution in which a concentration of ethanol is 20 wt % is prepared. Next, by dissolving Li source composed of $LiNO_3$, Mn source composed of $Mn(NO_3)_2.6H_2O$ and P source composed of $NH_4H_2PO_4$ into the mixed solution so that their concentrations become 0.5 mol/L, inorganic source solution of $LiMnPO_4$ is made. Carbon source composed of sucrose is then mixed to this inorganic source solution of $LiMnPO_4$ so that its concentration is adjusted so as to allow its molarity to be made larger than a molarity of Mn. In this embodiment, sucrose is added thereinto so as to allow its molarity to be 1 mol/L, thereby adjusting a precursor solution.

As Li source, Mn source and P source constituting the inorganic source solution of $LiMnPO_4$, any inorganic source composed of an acetate or a carbonate, in addition to the above-mentioned nitrate, maybe used. In a case of the acetate, $CH_3COOLi$ is used as Li source, $(CH_3COO)_2Mn.6H_2O$ is used as Mn source and $NH_4H_2PO_4$ is used as P source. In a case of the carbonate, $LiNO_3$ is used as Li source, $MnCO_2$ is used as Mn source and $NH_4H_2PO_4$ is used as P source.

As carbon source, furfuryl alcohol may be used in addition to the sucrose.

Next, as shown in FIG. 1B, dried polystyrene particles 1 are dipped into the precursor solution 2 during 5 through 7 days so that the precursor solution 2 is filled into spaces between polystyrene particles 1.

Next, as shown in FIG. 1C, a firing temperature Ts is set so as to become 600° C<=Ts<900° C. in argon atmosphere and the firing is performed for 16 hours. This enables a mold composed of the polystyrene particles 1 to be removed, thereby completing a nano composite porous electrode material 4 of olivine type lithium manganese phosphate ($LiMnPO_4$) having nano-size pores 3 and carbon. Composite of carbon is because a part of polystyrene and added sucrose is carbonized and remained in a moment of firing. The nano composite porous electrode material 4 completed by this embodiment is formed so that the amount of contained carbon Cc is 15.5 wt %<Cc<28 wt %, the specific surface area Sa thereof is 55 $m^2g^{-1}<Sa<248$ $m^2g^{-1}$ and a diameter of crystallite is less than 39 nm.

In this embodiment, the pores 3 have been completed using mold particles (polystyrene particles 1) but by a size of particle to be used as a mold, a diameter of pore 3 finally made in the nano composite porous electrode material 4 may be controlled so that the specific surface area is controlled. In this embodiment, the specific surface area Sa may be optimally adjusted by adjusting the polystyrene particles 1, which become the mold, between 100 nm and 400 nm.

Further, the amount of contained carbon Cc may be optimally adjusted by the concentration of carbon source dissolved into the precursor solution.

The following will describe the nano composite porous electrode material according to this invention more in detail by showing an execution example and comparison examples, but this invention is not limited to the following execution example.

EXECUTION EXAMPLE

First, by centrifuging colloidal dispersion which contains polystyrene having particle size of 200 nm, colloid crystals composed of the polystyrene particles were made. By decompressing and drying these polystyrene particles, polystyrene particles, which become a mold, were then obtained.

On the other hand, by mixing water with ethanol, a mixed solution in which a concentration of ethanol was 20 wt % was prepared. Next, by dissolving $LiNO_3$, $Mn(NO_3)_2 \cdot 6H_2O$ and $NH_4H_2PO_4$ into the mixed solution so that their concentrations became 0.5 mol/L and adding sucrose thereto so that its concentration became 1 mol/L, the precursor solution was adjusted. In other words, the molarity of sucrose was adjusted to a concentration twice as thick as the molarity of Mn in the precursor solution.

Next, by dipping dried polystyrene particles into the precursor solution during 5 through 7 days, the precursor solution was filled into spaces between the polystyrene particles.

Next, by carrying out the firing at a firing temperature of 700° C. in argon atmosphere for 16 hours, the mold composed of polystyrene particles was removes, thereby obtaining a specimen 1.

Comparison Example 1

First, by centrifuging colloidal dispersion which contains polystyrene having particle size of 200 nm, colloid crystals composed of the polystyrene particles were made. These polystyrene particles were then decompressed and dried.

On the other hand, by mixing water with ethanol, a mixed solution in which a concentration of ethanol was 20 wt % was prepared. Next, by dissolving $LiNO_3$, $Mn(NO_3)_2 \cdot 6H_2O$ and $NH_4H_2PO_4$ into the mixed solution so that their concentrations became 0.5 mol/L and adding sucrose thereto so that its concentration became 0.5 mol/L, the precursor solution was adjusted. In other words, the molarity of sucrose was adjusted to a concentration same as the molarity of Mn in the precursor solution.

Next, by dipping dried polystyrene particles into the precursor solution during 5 through 7 days, the precursor solution was filled into spaces between the polystyrene particles.

Next, by carrying out the firing at a firing temperature of 700° C. in argon atmosphere for 16 hours, the mold composed of polystyrene particles was removed, thereby obtaining a specimen 2.

The above-mentioned comparison example 1 is a case in which it is different from the execution example in only the concentration of sucrose to form the carbon source and the concentration of added sucrose in the comparison example 1 is a concentration half as thick as the concentration of sucrose of the execution example. Namely, the molarity of sucrose was adjusted to a concentration half as thick as the molarity of Mn in the precursor solution.

Comparison Example 2

First, by centrifuging colloidal dispersion which contains polystyrene having particle size of 200 nm, colloid crystals composed of the polystyrene particles were made. These polystyrene particles were then decompressed and dried.

On the other hand, by mixing water with ethanol, a mixed solution in which a concentration of ethanol was 20 wt % was prepared. Next, by dissolving $LiNO_3$, $Mn(NO_3)_2 \cdot 6H_2O$ and $NH_4H_2PO_4$ into the mixed solution so that their concentrations became 0.5 mol/L, the precursor solution was adjusted.

Next, by dipping dried polystyrene particles into the precursor solution during 5 through 7 days, the precursor solution was filled into spaces between the polystyrene particles.

Next, by carrying out at a firing temperature of 700° C. in argon atmosphere for 16 hours, the mold composed of polystyrene particles was remove, thereby obtaining a specimen 3.

The above-mentioned comparison example 2 is a case in which it is different from the execution example in that no sucrose is added and the other configuration is similar to that of the execution example.

Comparison Example 3

Water was mixed with ethanol and $LiNO_3$, $Mn(NO_3)_2 \cdot 6H_2O$ and $NH_4H_2PO_4$ were mixed into a mixed solution in which a concentration of ethanol was 20 wt % so that their concentrations became 0.5 mol/L.

Next, by firing this mixed solution at a firing temperature of 700° C. in argon atmosphere for 16 hours, a specimen 4 was obtained. Namely, this comparison example 3 is a case where no polystyrene particle, which become a mold, is used and a case where bulk $LiMnPO_4$ in which there is no pore is prepared.

[Estimations of Specimens 1 through 4]

Figure 2:
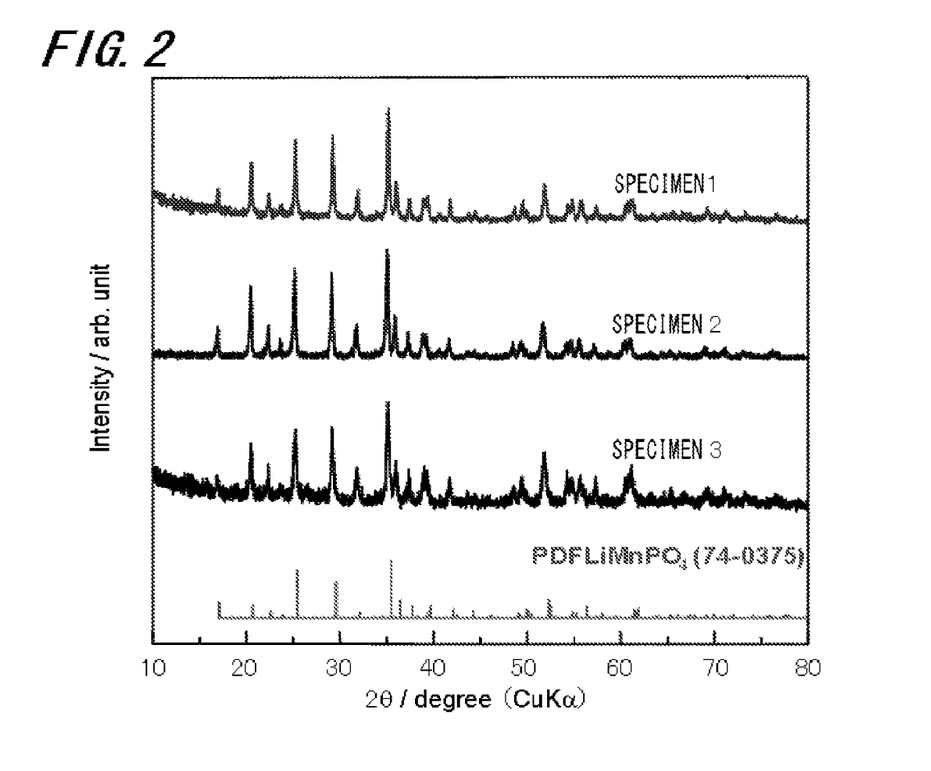
[FIG. 2] is a diagram showing X-ray diffraction (XRD) patterns of specimens 1 throughand an X-ray diffraction patterns of a crystal composed of pure $LiMnPO_4$.

First, FIG. 2 shows X-ray diffraction (XRD) patterns of specimens 1 through 3 and an X-ray diffraction pattern of a crystal composed of pure $LiMnPO_4$. Each of the X-ray diffraction patterns shown in FIG. 2 is obtained by irradiating CuKα ray and analyzing a crystalline structure using Bragg-Brentano method in which a horizontal axis of FIG. 2 shows an angle formed by an incident X-ray of CuKα ray and a diffracted X-ray thereof and a vertical axis thereof shows intensity of the diffracted X-ray (a scale is optional).

As shown in FIG. 2, in all of the specimens 1 through 3, the diffraction patterns which are similar to that of olivine type pure $LiMnPO_4$ that has been registered in a data base can be observed. Thus, it is found out that any crystals of olivine type $LiMnPO_4$ are made in the specimens 1 through 3.

Next, a table 1 indicates measurement results of a diameter of crystallite, a specific surface area and an amount of contained carbon of each of the specimens 1 through 4 which were manufactured in the above-mentioned execution example and comparison examples 1 through 3.

TABLE 1

| | | Firing Temperature (° C.) | Diameter of Crystallite (nm) | Specific Surface Area ($m^2 g^{-1}$) | Amount of Contained Carbon (Wt %) |
|---|---|---|---|---|---|
| Execution Example 1 | Specimen 1 | 700° C. | 26 | 124 | 25 |
| Comparison Example 1 | Specimen 2 | 700° C. | 45 | 54 | 15.5 |
| Comparison Example 2 | Specimen 3 | 700° C. | 39 | 49 | 1.6 |
| Comparison Example 3 | Specimen 4 | 700° C. | 128 | 10 | n.d. |

The diameter of crystallite was calculated from a width of half values of the peak derived from (020) surface of X-ray diffraction using Scherrer equation.

The specific surface area was obtained from a nitrogen adsorption isotherm measured at 77K by using Brunauer-Emmett-Teller (BET) method.

The amount of contained carbon was measured by using elementary analysis.

The specimen 1 manufactured in the execution example has a diameter of crystallite of 26 nm, which is the smallest of the specimens 1 through 4, and a specific surface area and an amount of contained carbon of 124 $m^2g^{-1}$ and 25 wt %, respectively, which are the largest of the specimens 1 through 4.

The specimen 2 manufactured in the comparison example 1 has a diameter of crystallite of 45 nm, which is larger than that of the specimen 1, and a specific surface area and an amount of contained carbon of 54 $m^2g^{-1}$ and 15.5 wt %, respectively, which are smaller than those of the specimen 1.

The specimen 3 manufactured in the comparison example 2 has a diameter of crystallite and a specific surface area of 39 nm and 49 $m^2g^{-1}$, respectively, which are not almost different from those of the specimen 2, and an amount of contained carbon of 1.6 wt %, which is a small quantity thereof.

The specimen 4 manufactured in the comparison example 3 has a diameter of crystallite of 128 nm, which is the largest thereof. Further, since the specimen 4 has been manufactured without using any mold, it contains no carbon so that a specific surface area is a small quantity thereof.

Between the execution example and the comparison example 1, there is a difference of a concentration of sucrose mixed to the precursor solution. As seen from the table 1, it is understood that if a molarity of sucrose to become the carbon source in the precursor is larger than a molarity of Mn in the precursor (larger than the same molarity), the nano composite porous electrode material in which more carbons are contained and which has a large specific surface area is obtained. Further, although the specimens have been manufactured in the execution example and the comparison examples 1 and 2 using the mold having the same dimension (polystyrene particles having a diameter of 200 nm), it is found out that the more the amount of contained carbon is, the specific surface area is larger. Particularly, in the execution example in which the molarity of sucrose is adjusted to a concentration twice as thick as the molarity of Mn in the precursor solution, a structure having a specific surface area more than twice has been obtained as compared with the comparison example 1 in which such that the molarity of sucrose has been adjusted so as to have the same molarity as the molarity of Mn.

Figure 3:
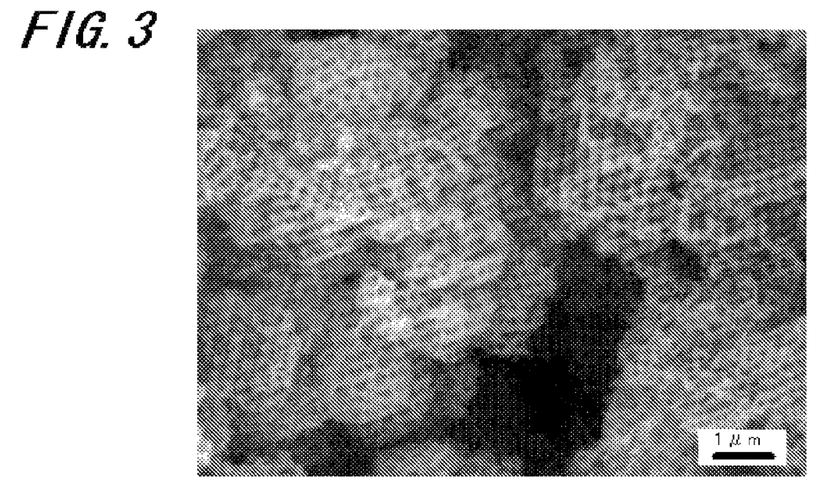
[FIG. 3] is a photograph of the specimen 1 manufactured in an execution example by a scanning electron microscope (SEM).
Figure 4:
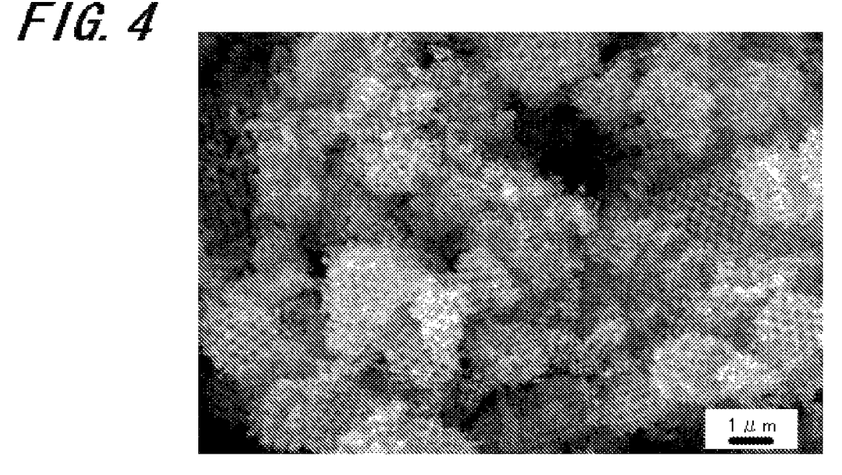
[FIG. 4] is a photograph of the specimen 2 manufactured in the comparison example 1 by SEM.

FIG. 3 is an SEM photograph of the specimen 1 manufactured in the execution example. FIG. 4 is an SEM photograph of the specimen 2 manufactured in the execution example 1. From FIGS. 3 and 4, it is found out that in the specimens 1 and 2, pores having a regularity are formed. Further, in the SEM photograph of the specimen 1 shown in FIG. 3, it can be observed up to an interior thereof, as compared with the SEM photograph of the specimen 2 shown in FIG. 4. This indicates that a structure of the specimen 1 has walls of pores having a three-dimensional regularity as compared with a structure of the specimen 2 (a porous structure such that the pores are three-dimensionally connected with each other). Since carbon is a material which has good flexibility, it is conceivable that the walls of pores having a three-dimensional regularity are formed so that the carbon is contained.

Thus, it is found out that in the specimen 1 of the execution example, based on much amount of contained carbon, a three-dimensional regularity of the pores is improved.

Next, charge-discharge behaviors of the specimens 1 through 4 were measured using a three-electrode cell composed of a working electrode, a reference electrode, an auxiliary electrode and nonaqueous electrolyte. The working electrode was made by mixing each specimen, an electrical conducting material composed of acetylene black and a binder composed of polytetrafluoroethylene (PTFE) at a ratio of 5:2:1 and pressing it onto an aluminum mesh. The reference electrode and the auxiliary electrode were made by pressing metallic lithium onto nickle meshes. As the nonaqueous electrolyte, the one in which electrolyte, $LiPF_6$ of one mol/L is dissolved into a mixed solvent of ethylene carbonate (EC) and dimethyl carbonate (DMC) (1:1v/v) was used.

In this three electrode cell, the charge and discharge were measured at a desired constant current density [mA/g] within an electric potential range of 3.0 V through 4.5 V (vs. $Li/Li^+$). The results thereof are shown in FIGS. 5 through 8.

Figure 5:
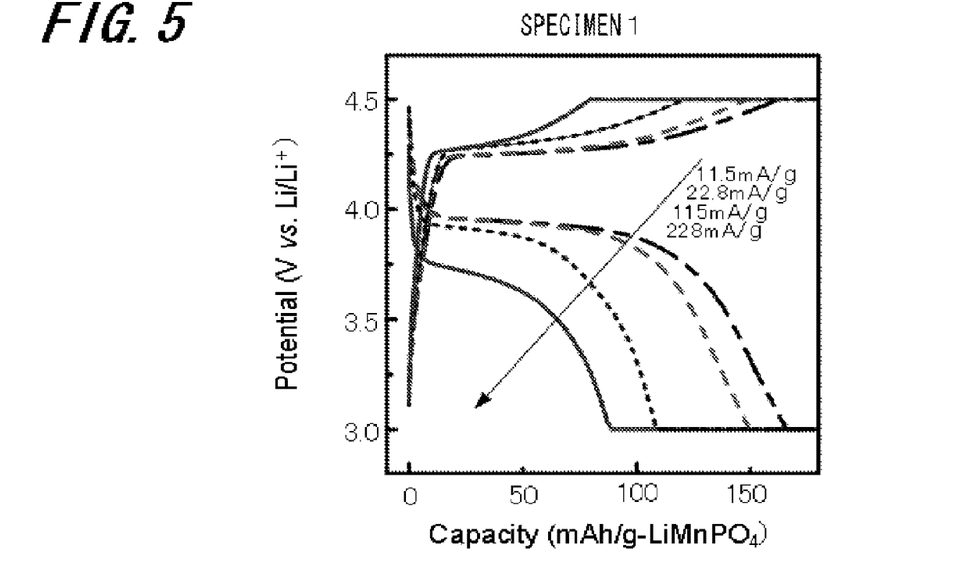
[FIG. 5] is a diagram showing charge and discharge curves of the specimen 1 made by the execution example.
Figure 6:
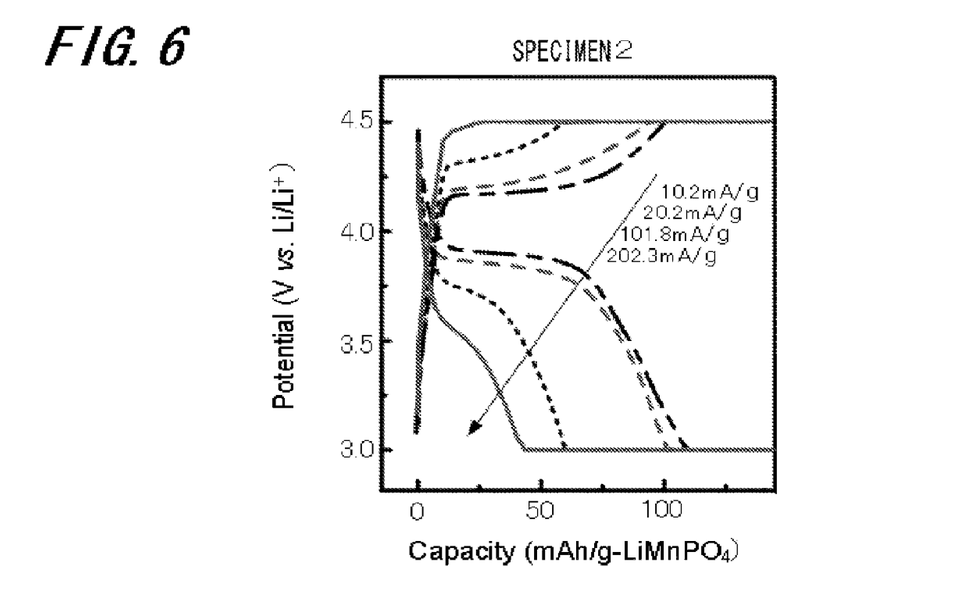
[FIG. 6] is a diagram showing charge and discharge curves of the specimen 2 made by the comparison example 1.

FIG. 5 is a diagram showing charge and discharge curves of the specimen 1 made by the execution example. FIG. 6 is a diagram showing charge and discharge curves of the specimen 2 made by the comparison example 1.

Figure 7:
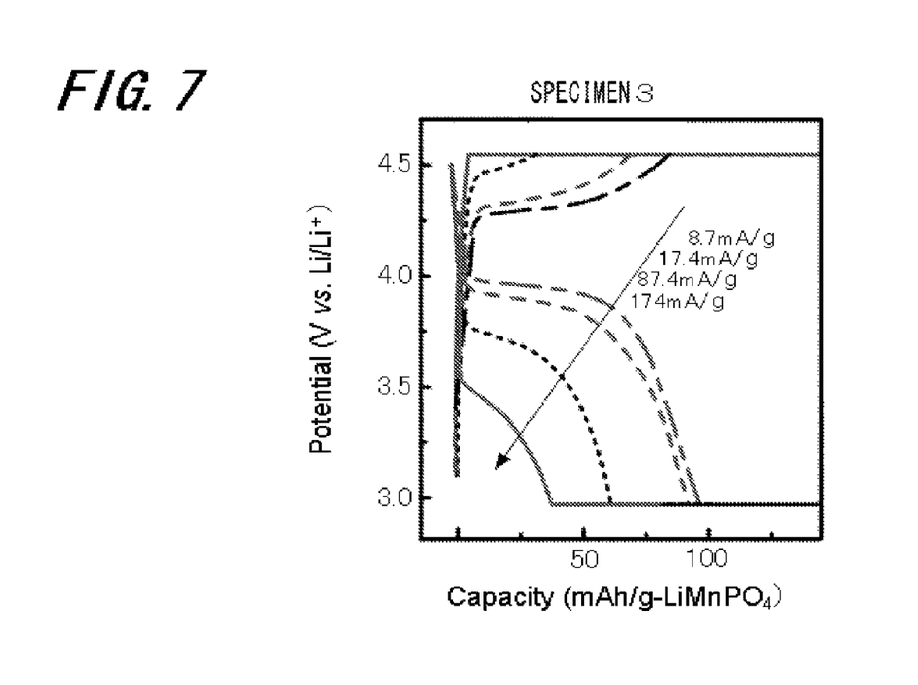
[FIG. 7] is a diagram showing charge and discharge curves of the specimen 3 made by the comparison example 2.
Figure 8:
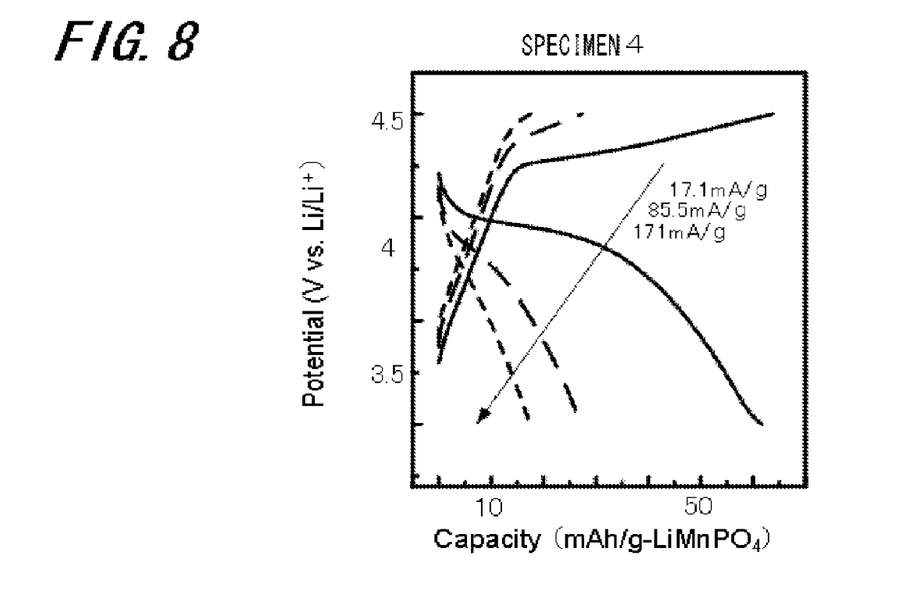
[FIG. 8] is a diagram showing charge and discharge curves of the specimen 4 made by the comparison example 3.

FIG. 7 is a diagram showing charge and discharge curves of the specimen 3 made by the comparison example 2. Further, FIG. 8 is a diagram showing charge and discharge curves of the specimen 4 made by the comparison example 3. A horizontal axis of each of the FIGS. 5 through 8 shows charge and discharge capacity per unit time and a vertical axis thereof shows discharged potential (V vs. $Li/Li^+$). Further, curves in which potentials increase in a direction where capacities increase are discharge curves and the reverse ones thereof are charge curves.

Although a theoretical capacity of the olivine type $LiMnPO_4$ is 171 mAh/g, in the specimens 2 through 4, a value thereof which is lower than the theoretical capacity by 60 mAh/g or more is indicated at low current density (at about 8 through 12 mA/g). In the specimen 1 of the execution example, however, a value (165 mAh/g) thereof which is close to the theoretical capacity is indicated at low current density (at 11.5 mA/g).

Further, as seen from FIGS. 5 through 8, the specimen 1 of the execution example has a higher charge and discharge capacity even at a high current density (about 100 through 200 mA/g) as compared with the specimens 2 through 4. Thus, it is found out that the specimen 1 is superior to the specimens 2 through 4 in a fast charge and discharge behavior and a high output performance.

Figure 9:
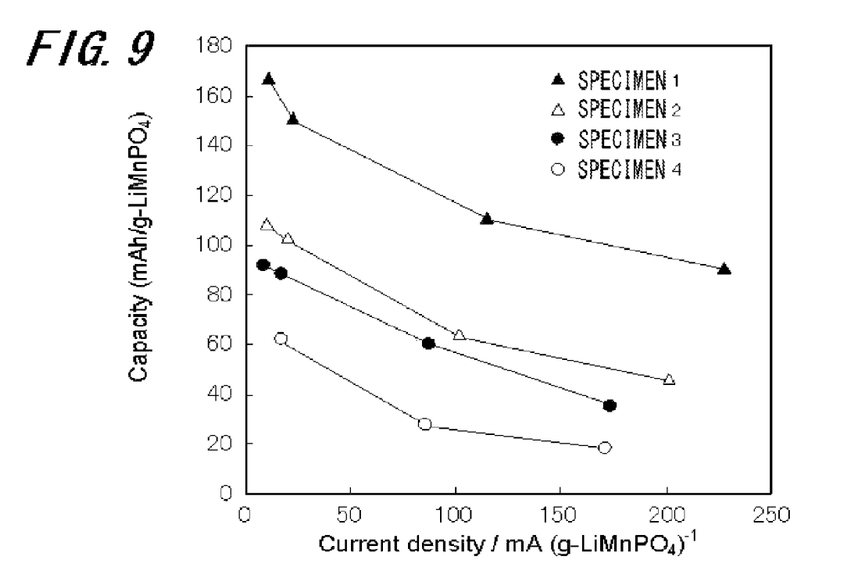
[FIG. 9] is a diagram showing current density dependencies of discharge capacity (rate performances) of the specimens made by the execution example and the comparison examples 1 through 3 on the basis of weight of $LiMnPO_4$.
Figure 10:
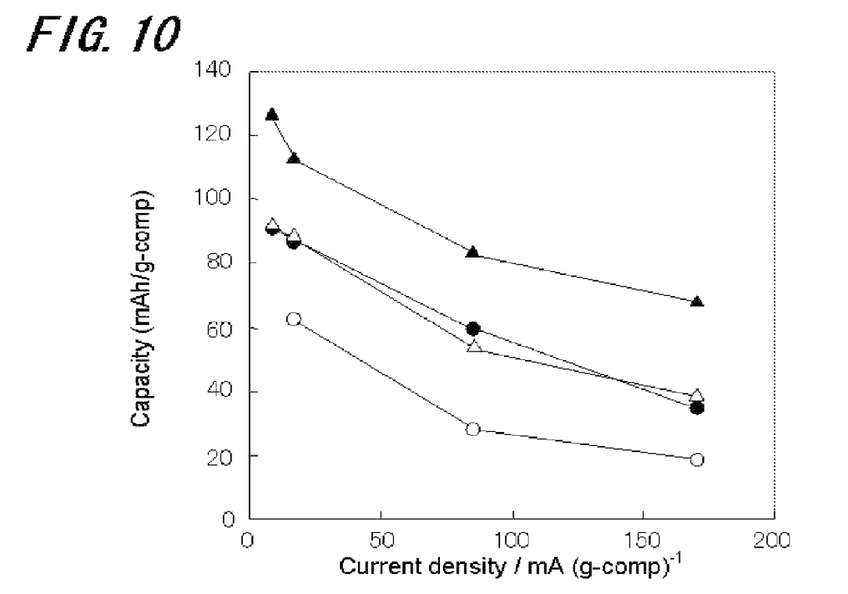
[FIG. 10] is a diagram showing current density dependencies of discharge capacity (rate performances) of the specimens made by the execution example and the comparison examples 1 through 3 on the basis of weight of $LiMnPO_4$/carbon composite.

FIGS. 9 and 10 are diagrams showing rate performances of the specimens 1 through 4. FIG. 9 is a diagram on the basis of weight of $LiMnPO_4$, which is an active material, and FIG. 10 is a diagram on the basis of weight of the composite of $LiMnPO_4$, which is an active material, and the carbon. A horizontal axis of each of the FIGS. 9 and 10 shows a current density (mA/g) and a vertical axis thereof shows a charge and discharged capacity (mAh/g).

As seen from FIG. 9, in a case of the basis of weight of $LiMnPO_4$, which is an active material, the charge and discharge behaviors of the specimen 2 of the comparison example 1 and the specimen 3 of the comparison example 2 are not much different from each other. Further, as seen from FIG. 10, in a case of the basis of weight of the composite of $LiMnPO_4$, which is an active material, and the carbon, the specimen 1 of the execution example has a charge and discharge capacity which is almost close to the theoretical capacity and has good rate performance.

Namely, in a case where the amount of contained carbon is 15.5 wt % or less like the specimen 2, it is understood that the amount of contained carbon does not cause any improvement of performance as the composite of the carbon and LiMnPO$_4$. There is a constant threshold value in the amount of contained carbon for the carbon to be in effect on an improvement of performance of the nano composite porous electrode material. For this reason, in the specimen 2 which has the amount of contained carbon not more than the threshold value, this is not in effect. Thus, it is desired that the amount of contained carbon is more than at least 15.5 wt %.

Since a theoretical capacity of the LiMnPO$_4$ is 171 mAh/g, a capacity [mA/g-comp] as the composite including carbon decreases as the amount of contained carbon increases. When the amount of contained carbon is 28 wt %, by estimating that whole of the theoretical capacity of LiMnPO$_4$ is discharged, 123 mAh/g-comp is a capacity as the composite. This value is similar to a capacity on the current density of 8.6 mA/g in the performance on the basis of the composite in the specimen shown in FIG. 10. Namely, the amount of contained carbon is 28 wt % or more, a capacity less than the capacity of the execution example is considered so that it is preferable that the amount of contained carbon is not more than 28 wt %. Further, the smaller, a size of crystal is, Li can spread over whole of the crystal in a short time, which prevents a polarization and is favorable to high output/large capacity. From the results of the execution example and the comparison examples 1 through 3, it is preferable that a diameter of crystallite is less than 39 nm.

Thus, in the specimen 1 of the execution example, the amount of contained carbon is more than those of the specimens 2 through 4 and it has an amount of contained carbon which is suitable for an improvement of the performance thereof. Accordingly, the pores having three-dimensional regularity are formed and the specific surface area is made larger. Since the amount of contained carbon is suitable in the specimen 1, a conductivity is improved so that electrons can spread into whole of the crystal, thereby realizing an improvement of charge and discharge capacity and a good rate performance.

Here, a relationship between an amount of contained carbon and a specific surface area will be described. If a close-packed state of polystyrene particles is reflected to a pore structure in a porous material as it is, the specific surface area Sa is theoretically represented according to the following Equation 1.

$$Sa = \frac{\sqrt{2}\,\pi}{d\rho\{1 - \pi/(3\sqrt{2})\}} \quad \text{[Equation 1]}$$

In the Equation 1, Sa indicates a specific surface area, "d" indicates a diameter of pore, and "ρ" indicates a density of material.

Further, a theoretical density of LiMnPO$_4$ is 3.49 gcm$^{-3}$; a popular density of amorphous carbon is 2.0 gcm$^{-3}$; and a theoretical density of the composite composed of LiMnPO$_4$ and carbon in a ratio of 0.75:0.25 is 3.12 gcm$^{-3}$. In this case, a theoretical value of specific surface area Sa is calculated. When using polystyrene particles having a diameter of 200 nm as a mold, the pores are shrunk when carrying out the firing so that really formed pores become about 100 nm. Therefore, when performing a calculation using d=100 nm, a theoretical value of specific surface area Sa of LiMnPO$_4$ porous material is Sa=49 m$^2$g$^{-1}$ and a theoretical value of specific surface area Sa of the composite composed of LiMnPO$_4$ and carbon is Sa=55.2 m$^2$g$^{-1}$. Further, when the pore has a diameter of d=50 nm, a theoretical value of specific surface area Sa of LiMnPO$_4$ porous material is Sa=98 m$^2$g$^{-1}$ and a theoretical value of specific surface area Sa of the composite composed of LiMnPO$_4$ and carbon is 110.4 m$^2$g$^{-1}$. Namely, if a size of the pore becomes half, the specific surface area Sa has a double value.

By the way, in the specimen 1 manufactured in the execution example, the specific surface area Sa is 124 m$^2$g$^{-1}$ which considerably exceed the theoretical value (Sa=55.2 m$^2$g$^{-1}$) if the pores of the specimen 1 are formed so as to have a diameter of 100 nm. This suggests that many micropores are formed in carbon contained in the composite of LiMnPO$_4$ and carbon and a specific surface area of the carbon portion contributes to the specific surface area as the composite. This can be also explained by the specific surface area of the specimen 3 of the comparison example 2 excluding any carbon source, which has a value that is close to the theoretical value (Sa=49 m$^2$g$^{-1}$) of LiMnPO$_4$ porous material (d=100nm), and a fact such that a hard carbon system is subject to porous and generally has a specific surface area of 800 through 2000 m$^2$g$^{-1}$.

Thus, it is found out that a specific surface area of carbon portion is deeply related to a reason why a specific surface area that is larger than the theoretical value is obtained in the specimen 1 of the execution example.

Further, if a porous material in which the pores having a diameter of about 50 nm is obtained when the polystyrene particles have a diameter of 100 nm are used as the mold, the specific surface area is 248 m$^2$g$^{-1}$ based on the above-mentioned reason. Thus, the smaller the diameter of polystyrene particle is, the specific surface area is larger. When a diameter of the polystyrene particle is smaller than 100 nm, a problem such that it is difficult to make a colloid crystal in which the polystyrene particles are regularly arranged occurs, a problem such that a regularly arranged pore structure is not formed accompanying this occurs, and there is a tendency to progress the firing because the pores formed after the mold has been removed are small and allow the pores to be crushed. Therefore, it is preferable that a mean diameter of polystyrene particles is not less than 100 nm.

Figure 11:
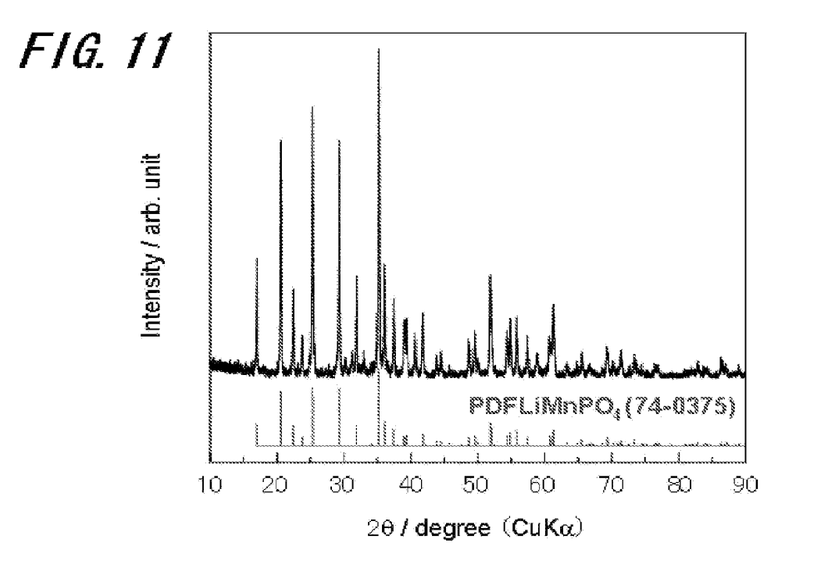
[FIG. 11] is a X-ray diffraction pattern (XRD) of the nano composite porous electrode material formed by the steps similar to those of the execution example at a firing temperature of 900° C.
Figure 12:
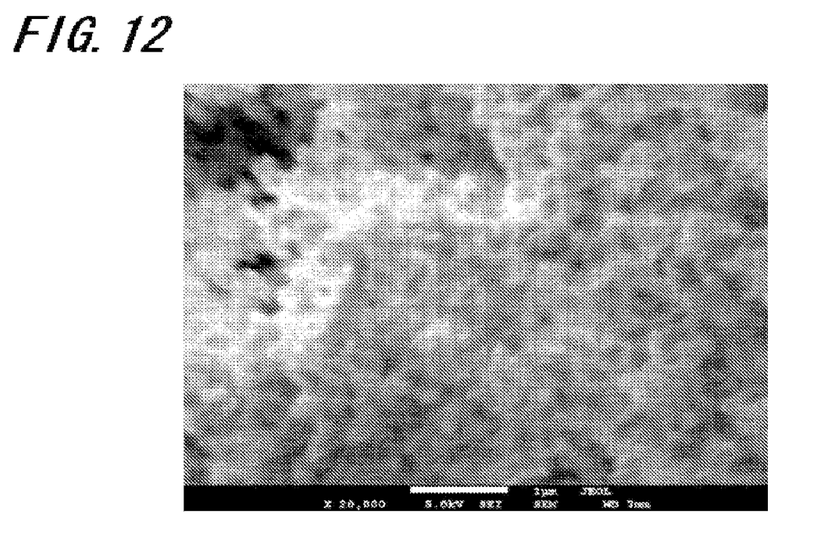
[FIG. 12] is an SEM photograph of the nano composite porous electrode material formed by the steps similar to those of the execution example at a firing temperature of 900° C.

Although a case where the firing temperature is set to 700° C. to carry out the firing has been explained in the above-mentioned execution example, the firing temperature is not limited to 700° C., FIG. 11 shows a X-ray diffraction pattern (XRD) of the nano composite porous electrode material formed by the steps similar to those of the execution example at a firing temperature of 900° C. FIG. 12 shows an SEM photograph of the nano composite porous electrode material thereof.

AS seen from FIG. 11, even when performing the firing at 900° C., the peaks similar to those of LiMnPO$_4$ crystal are indicated so that it is found out that olivine type LiMnPO$_4$ phase is formed. However, from the SEM photograph of FIG. 12, it is found out that a porous structure is lost at the firing temperature of 900° C. Accordingly, it is preferable that an upper limit of the firing temperature is a temperature that is less than 900° C.

Further, if the firing temperature is less than, for example, 600° C., a problem occurs such that LiMnPO$_4$ is poorly crystallized to make a capacity smaller and the contained carbon source is incompletely carbonized so that since many chemical functional groups remain, any electrochemical side reaction occurs. Accordingly, it is preferable that the firing temperature stays within a range of not less than 600° C. and less than 900° C.

Figure 13:
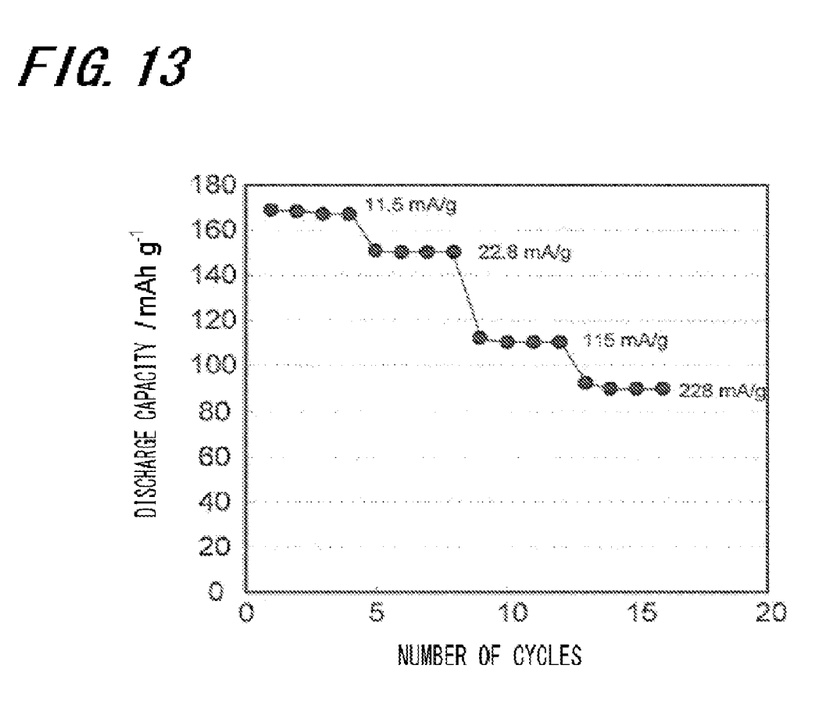
[FIG. 13] is a diagram showing cycle life characteristic of the specimen 1 on each current density.

FIG. 13 shows discharge capacity of the specimen 1 on each of the current densities, 11.5 mA/g, 22.8 mA/g, 115 mA/g and 228 mA/g. A horizontal axis of FIG. 13 show cycle life and a vertical axis shows the discharge capacity. Measurements are carried out four times per each current density. From FIG. 13, it is found out that even if it is repeatedly used, the discharge capacity remains unchanged. Accordingly, it is found out that even if plural repetition s are carried out as a positive electrode material of a battery, a stable performance can be obtained.

As described above, by controlling an amount of contained carbon and a specific surface area suitably, the nano composite porous electrode material according to this embodiment may exhibit a high capacity performance and a high output performance, as compared with a conventional electrode material composed of $LiMnPO_4$. Further, by the manufacturing method of the nano composite porous electrode material according to this embodiment, it is possible to obtain a nano composite porous electrode material which has a charge and discharge capacity with a value that is more close to its theoretical value.

The following will describe a lithium-ion secondary battery using the nano composite porous electrode material according to this embodiment as the positive electrode active material.

<2. Second Embodiment>
[Lithium-Ion Secondary Battery]

Figure 14:
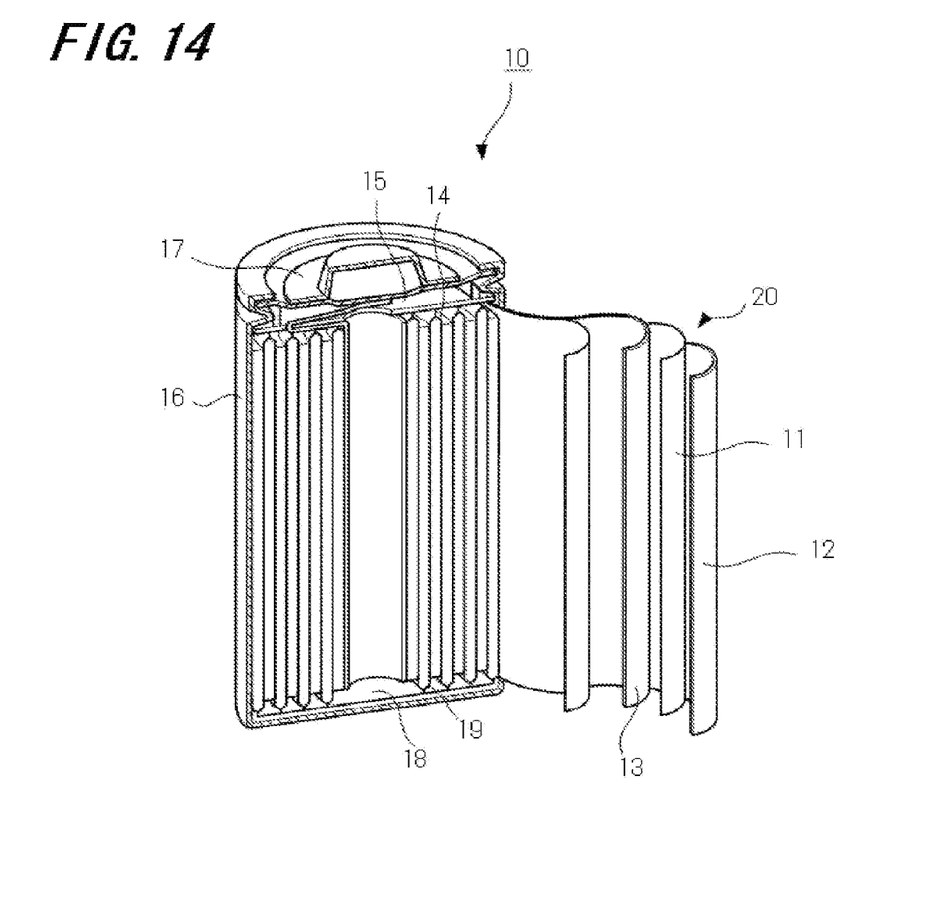
[FIG. 14] is a diagram showing an outline configuration of a lithium-ion secondary battery according to a second embodiment of this invention.

FIG. 14 shows an outline configuration of a lithium-ion secondary battery according to a second embodiment of this invention. The lithium-ion secondary battery 10 according to this embodiment is a case where the nano composite porous electrode material according to the first embodiment are used as positive electrode active materials.

The lithium-ion secondary battery 10 according to this embodiment is constituted of a cylindrical container 16 composed of nickel, a rolled-up body 20 contained in the container 16 and nonaqueous electrolyte which is similarly contained the container 16.

A positive terminal 17 is formed on an upper bottom portion of the container 16. Further, a negative terminal, not shown, is formed on an lower bottom portion of the container 16.

The rolled-up body 20 is configured so as to wind a laminated body like a roll in which a band-like positive electrode element 12, a separator 11, a negative electrode element 13 are laminated in order. The positive electrode element 12 is configured so as to press mixed materials of positive electrode active materials composed of the above-mentioned nano composite porous electrode material according to the first embodiment, a conducting agent and a binder to a metallic foil composed of, for example, aluminum. The negative electrode element 13 is configured so as to press mixed materials of negative electrode active material, for example, graphite that has been used until now, a conducting agent and a binder to a metallic foil composed of, for example, copper. Further, the separator 11 can use any conventionally used materials and is configured by, for example, polymer film such as polypropylene.

In the rolled-up body 20, the positive electrode element 12 and the negative electrode element 13 are electrically separated by the separator 11.

As the nonaqueous electrolyte, any conventionally used materials can be used and a mixed solution in which lithium hexafluorophosphate ($LiPF_6$) or the like is dissolved as lithium salt into an organic solvent such as ethylene carbonate (EC) can be used. The nonaqueous electrolyte is impregnated in the container.

The positive electrode element 12 is then connected to a positive electrode tab connector 15 which is formed on the upper bottom of the container 16 by a lead wire 14 and this positive electrode tab connector 15 is electrically connected to the positive terminal 17 which is formed on the upper bottom of the container 16.

The negative electrode element 13 is then connected to a negative electrode tab connector 18 which is formed on the lower bottom of the container 16 by a lead wire 19 and this negative electrode tab connector 18 is electrically connected to the negative terminal which is formed on the lower bottom of the container 16.

According to this embodiment, it is possible to obtain a high-performance lithium-ion secondary battery 10 which has a large charge-discharge capacity and can be rapidly charged or discharged because the above-mentioned nano composite porous electrode material according to the invention can be used as the positive electrode active material.

DESCRIPTION OF CODES

1 . . . Polystyrene Particles; 2 . . . Precursor Solution; 3 . . . Pores;
4 . . . Nano Composite Porous Electrode Material; 10 . . . Lithium-ion Secondary Battery; 11 . . . Separator; 12 . . . Positive Electrode Element;
13 . . . Negative electrode Element; 14 . . . Lead Wire; 15 . . . Positive Electrode Tab Connector; 16 . . . Container; 17 . . . Positive Terminal;
18 . . . Negative Electrode Tab Connector; 19 . . . Lead Wire; and
20 . . . Rolled-up body

The invention claimed is:

1. A nano composite porous electrode material containing a porous structure such that nano-size pores are three-dimensionally connected with each other and walls of the pores have three-dimensional regularity wherein the walls of the pores thereof are composed of olivine type LiMnPO4 and carbon, a specific surface area Sa is 55 $m^2g^{-1}$<Sa<248 $m^2g^{-1}$, an amount of contained carbon Cc is 25 wt %<Cc<28 wt % and a diameter of crystallite is less than 39 nm.

2. The nano composite porous electrode material according to claim 1, wherein the carbon is supported in the walls of the pores.

3. A manufacturing method of the nano composite porous electrode material of claim 1, the method comprising:
 a step of preparing mold particles;
 a step of dipping the mold particles into a precursor solution of LiMnPO4 solution and a carbon source; and
 a step of firing composite of the mold particles and the precursor solution at a firing temperature of from 600° C. or more to less than 900° C. and removing the mold particles, wherein the carbon source is mixed so that its molarity is made larger than a molarity of Mn in the precursor solution.

4. The manufacturing method of nano composite porous electrode material according to claim 3, wherein the mold particles contain styrene particles having a diameter of particle of not less than 100 nm and not more than 400 nm.

5. A lithium-ion secondary battery comprising:
 a positive electrode element containing as positive electrode active material a nano composite porous electrode material into or from which lithium ions can be absorbed or discharged, the nano composite porous electrode material containing a porous structure such that nano-size pores are three-dimensionally connected with each other and walls of the pores have three-dimensional regularity wherein the walls of the pores thereof are composed of olivine type LiMnPO4 and carbon, a specific surface area Sa is 55 $m^2g^{-1}$<Sa<248 $m^2g^-$, an amount of contained carbon Cc is 25 wt %<Cc<28 wt % and a diameter of crystallite is less than 39 nm;
a negative electrode element containing a negative electrode active material which absorbs or discharges the lithium ions at lower electric potential than that of the positive electrode active material; and
nonaqueous electrolyte in which lithium salt is dissolved in a nonaqueous solvent solution.

6. The lithium-ion secondary battery according to claim 5 wherein the carbon is supported in the walls of the pores.

* * * * *

UNITED STATES PATENT AND TRADEMARK OFFICE
CERTIFICATE OF CORRECTION

| | | |
|---|---|---|
| PATENT NO. | : 9,147,879 B2 | |
| APPLICATION NO. | : 13/380026 | |
| DATED | : September 29, 2015 | |
| INVENTOR(S) | : Isamu Moriguchi | |

It is certified that error appears in the above-identified patent and that said Letters Patent is hereby corrected as shown below:

In The Claims

Column 12, line 67 "$m^2g^{-1}<Sa<248\ m^2g$" should be -- $m^2g^{-1}<Sa<248\ m^2g^{-1}$ --.

Signed and Sealed this
Fifteenth Day of March, 2016

Michelle K. Lee
*Director of the United States Patent and Trademark Office*